T. E. RICHARDS.
STRUCTURE.
APPLICATION FILED SEPT. 4, 1918. RENEWED JULY 10, 1920.

1,350,289.

Patented Aug. 17, 1920.
8 SHEETS—SHEET 1.

Inventor
T. E. Richards
by
W. E. Evans
Attorney.

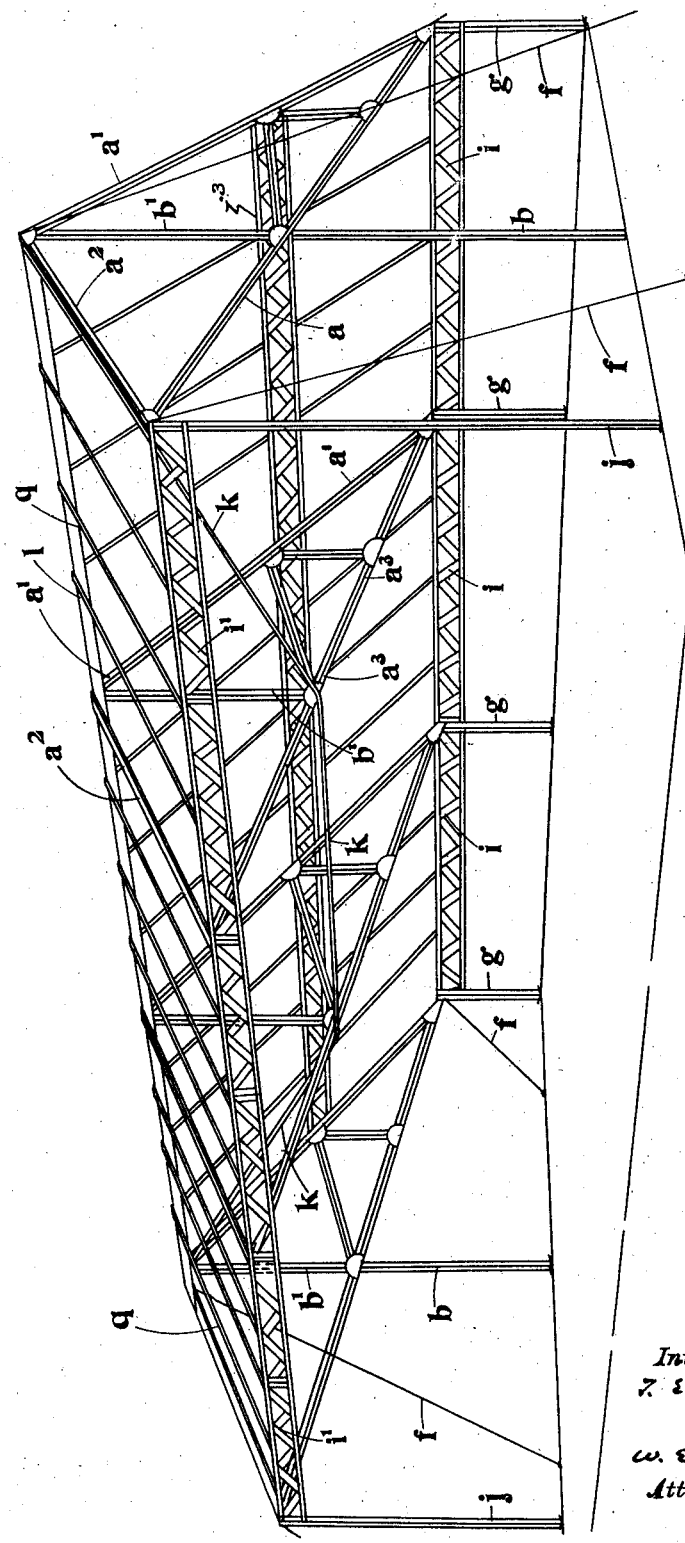

T. E. RICHARDS.
STRUCTURE.
APPLICATION FILED SEPT. 4, 1918. RENEWED JULY 10, 1920.
1,350,289.
Patented Aug. 17, 1920.
8 SHEETS—SHEET 4.
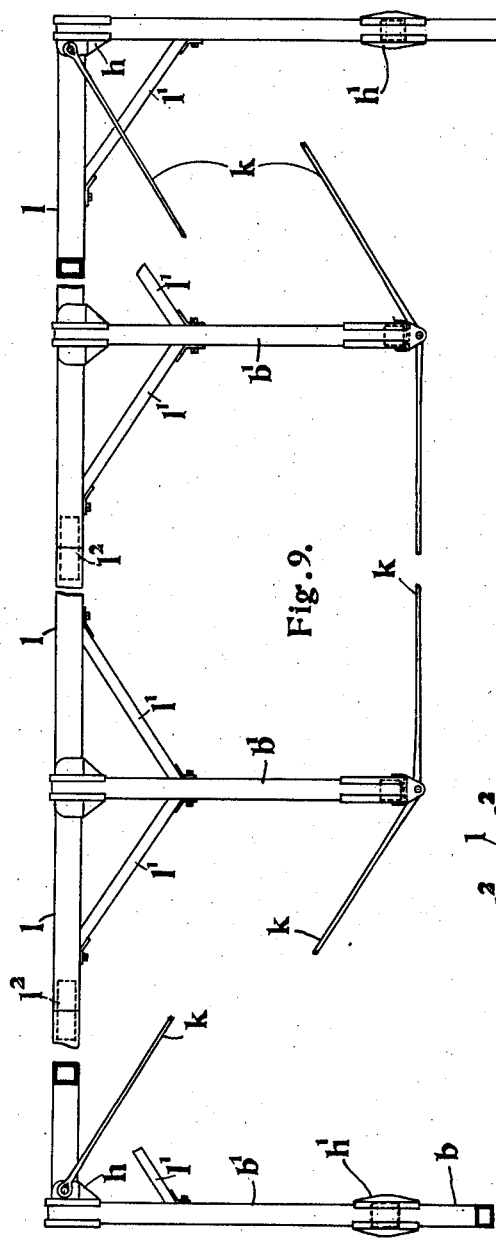
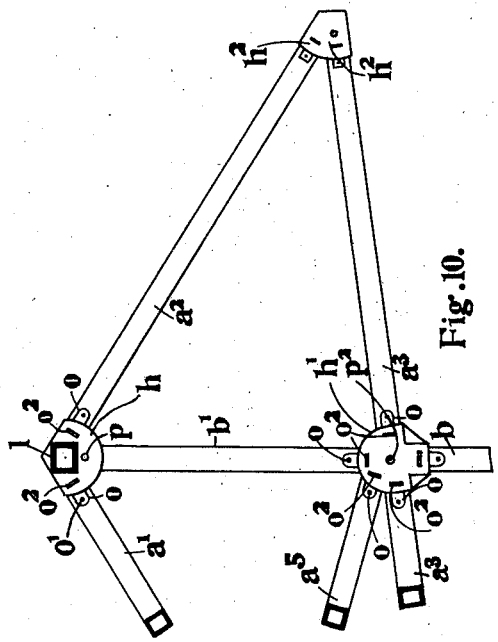
Inventor
T. E. Richards.
by
W. E. Evans
Attorney.

T. E. RICHARDS.
STRUCTURE.
APPLICATION FILED SEPT. 4, 1918. RENEWED JULY 10, 1920.

1,350,289.

Patented Aug. 17, 1920.
8 SHEETS—SHEET 5.

Inventor
T. E. Richards
by
W. E. Evans
Attorney.

T. E. RICHARDS.
STRUCTURE.
APPLICATION FILED SEPT. 4, 1918. RENEWED JULY 10, 1920.
1,350,289.
Patented Aug. 17, 1920.
8 SHEETS—SHEET 6.
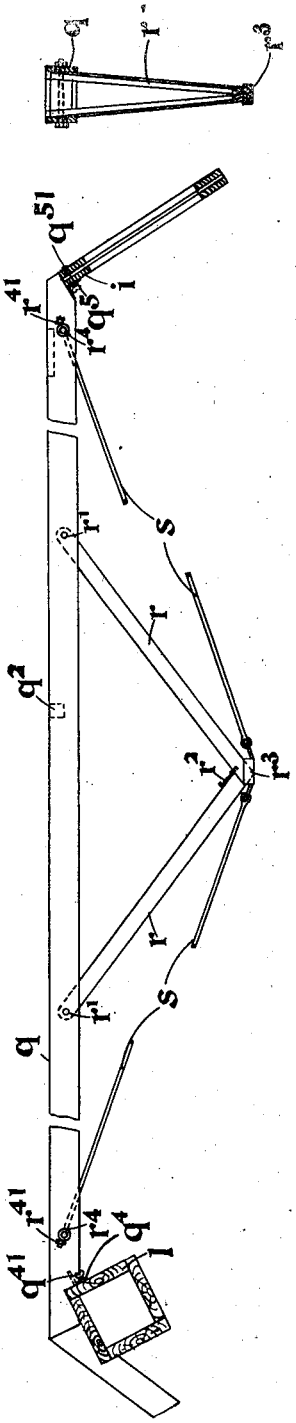
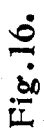
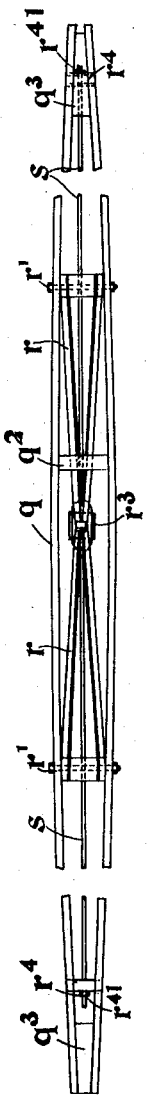
Inventor
T. E. Richards
by
W. E. Evans
Attorney.

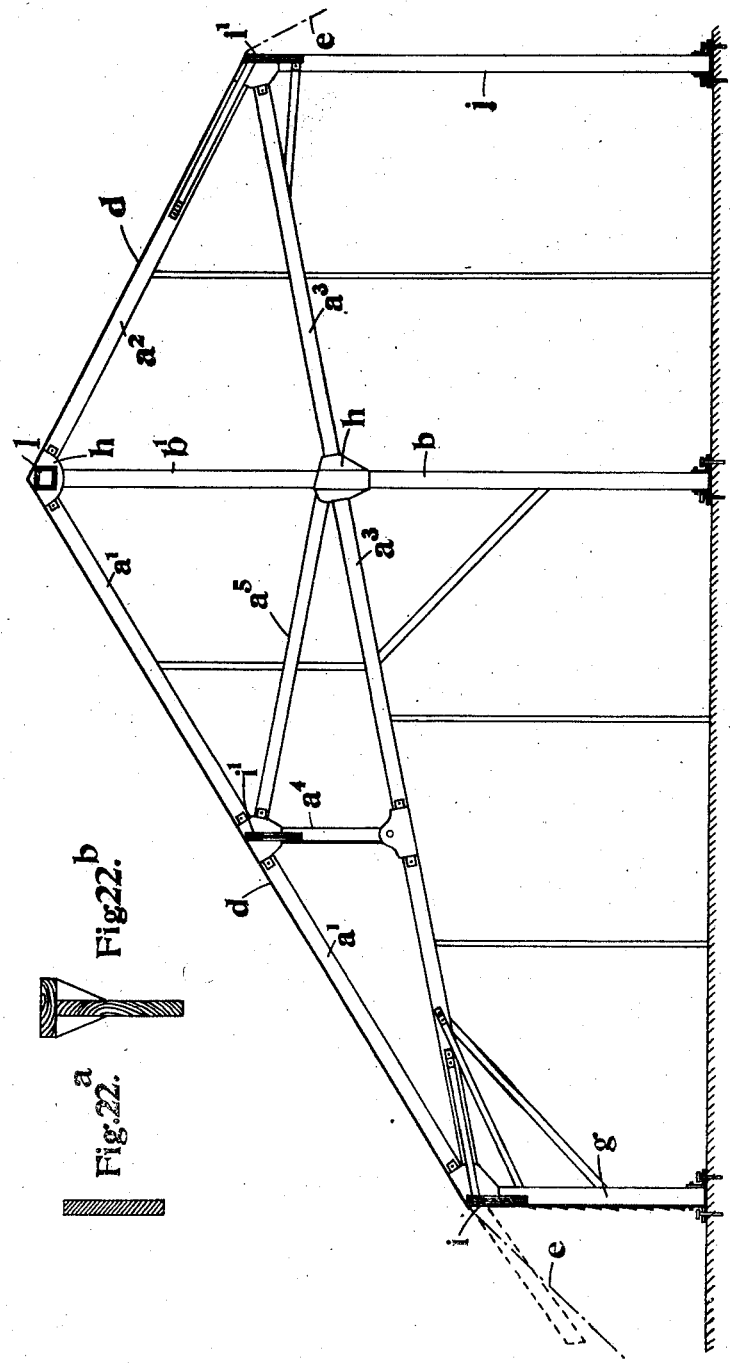

UNITED STATES PATENT OFFICE.

THOMAS EDGAR RICHARDS, OF LONDON, ENGLAND.

STRUCTURE.

1,350,289. Specification of Letters Patent. Patented Aug. 17, 1920.

Application filed September 4, 1918, Serial No. 252,649. Renewed July 10, 1920. Serial No. 395,380.

*To all whom it may concern:*

Be it known that I, THOMAS EDGAR RICHARDS, a subject of the King of Great Britain and Ireland, residing at 16 Albemarle street, London, W. I., England, have invented certain new and useful Improvements Relating to Structures, of which the following is a specification.

This invention relates to structures, and has been made more especially with the idea of providing structures applicable for the purpose of hangars, that is, for the accommodation of aeroplanes or aircraft, although the invention may obviously be applied to structures for other purposes to which it may be found suitable.

The invention has among its objects to provide a structure covering an extensive area which is unobstructed by posts or ground supports for supporting the intermediate rafter trusses employed, so that thus the structure is, for example, adapted for the reception of aeroplanes without it being necessary for them to occupy particular positions such as would be necessary where intermediate supports for the roof were provided. The invention also aims to provide a structure of a portable character that is readily erected, and if required, readily removed, while yet being adapted to withstand wind and weather.

According to the invention in its application to the construction of a hangar for aeroplanes, I employ triangular rafter trusses each consisting of rafter members and a brace or tie carrying in a middle position a vertical member which may be mounted in alinement with a supporting post by which the truss is thus supported at an intermediate point with reference to its length. The truss is also supported near one end, that is to say at the rear of the structure by another post which is advantageously of shorter length than the middle post so that thus the brace or tie of the rafter truss is inclined upwardly toward the opposite or front end, and the truss overhangs the middle supporting means and is unsupported at the opposite end or front of the structure, extending from the middle supporting post as a cantilever. The respective end rafter trusses may, however, be supported at the front by means of posts. The respective trusses are united at the rear, and at the front by parallel purlins. Advantageously these purlins may be trussed to insure the utmost rigidity. The rafter trusses are also united at the ridge by a trussed purlin or other suitable ridge member.

Any number of such rafter trusses may be employed in parallel positions and the end rafter trusses alone or those in other determined positions may be supported from the ground beneath the vertical member of the truss.

According to the invention in a structure such as before described, a longitudinal or ridge truss is formed comprising a tension member or tie extending transversely beneath vertical members of the intermediate trusses, which tie then extends upwardly at each end to the end of the ridge member or to a fitting mounted upon the middle post of the end rafter trusses. The vertical members or posts of the respective intermediate rafter trusses thus form struts for the longitudinal or ridge truss or girder and the necessity of employing posts for the support of the intermediate trusses from the ground in a middle position in alinement with the vertical members of the respective trusses is avoided.

The invention is illustrated in the accompanying drawings in which—

Figs. 4 to 18 illustrate a modification.

Figs. 4, 6, 7 and 8 are diagrammatic representations of the structure shown in perspective in Fig. 8ª, being a longitudinal section, front elevation, roof plan, side elevation and ground plan respectively of a temporary structure or hangar for the accommodation of a number of aeroplanes.

Fig. 9 is a detail enlarged partial front view showing the ridge member and the rafter trusses, and Fig. 10 is a corresponding detail side view of a part of one of the rafter trusses.

Figs. 11, 12 and 13 are enlarged detail side, front and plan views respectively showing the connection of the rafter members to the upper ends of the struts or vertical members of the rafter trusses.

Figs. 14 and 15 are enlarged detail side and cross sectional views respectively of the connection of the lower ends of the struts with the adjacent members of the truss, and Figs. 16, 17 and 18 are enlarged detail side elevation, plan and end elevation of the rafter members that may be employed.

Figs. 19 to 22 illustrated a further modification in which

Figure 19:
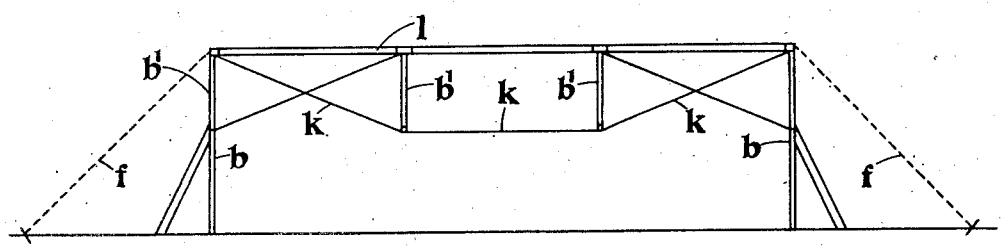
Figure 20:
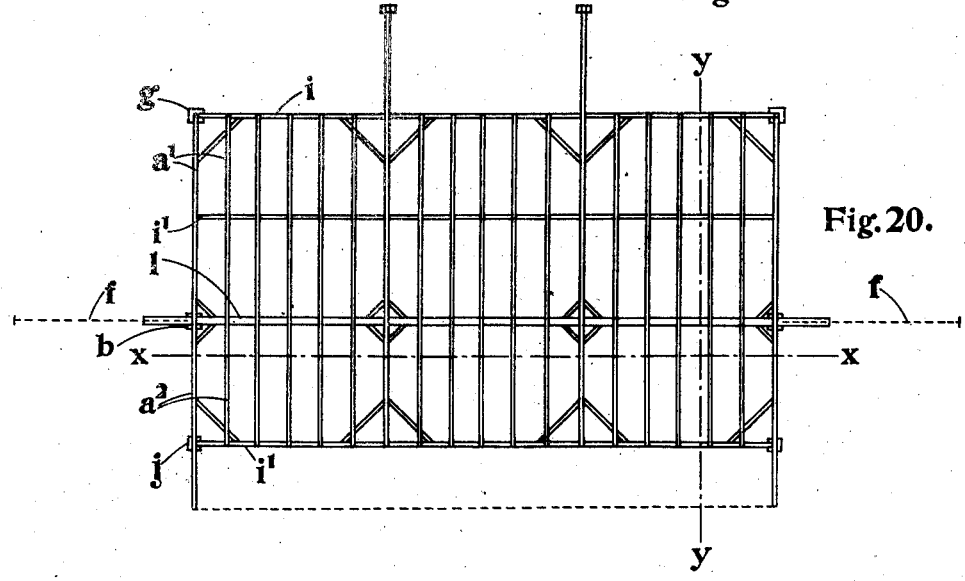
Figure 21:
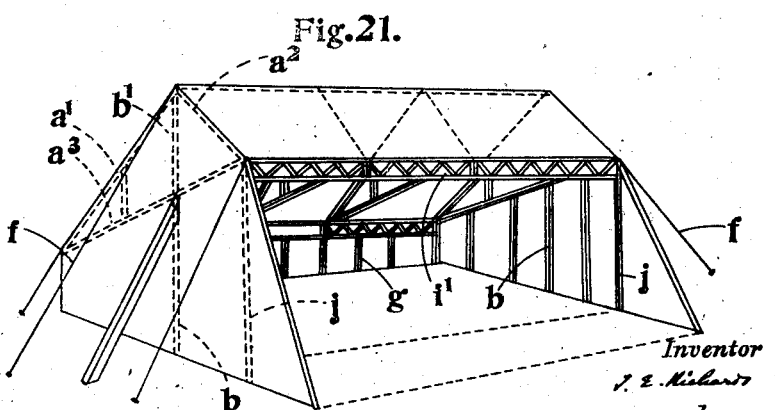

Fig. 19 is a diagrammatic section on the line x—x. of Fig. 20,

Fig. 20 is a diagrammatic plan,

Fig. 21 is a perspective view of the construction illustrated in Figs. 19 and 20, and Fig. 22 is a cross section on an enlarged scale on the line y—y Fig. 20.

Figs. $22^a$ and $22^b$ are cross sections of rafters.

Figure 1:
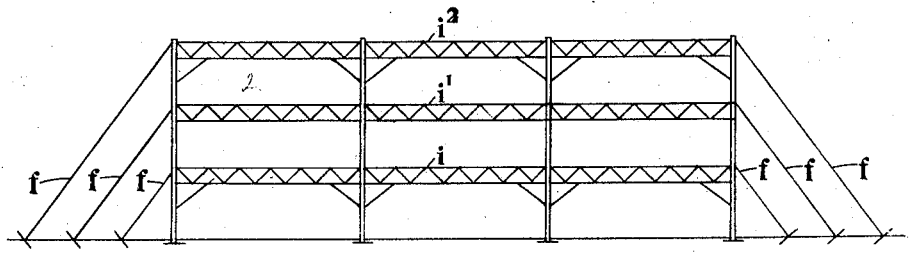
Figures 1 to 3 are front diagrammatic elevation, plan and side elevation of a temporary structure or hangar for a single aeroplane.
Figure 2:
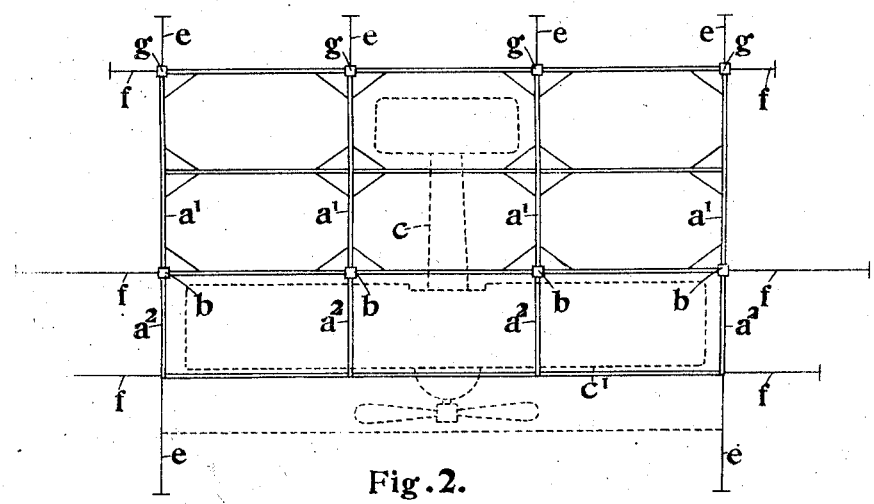
Figure 3:
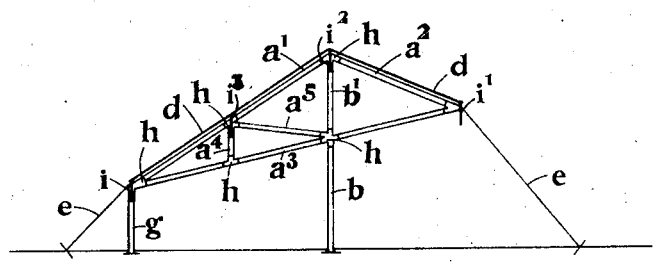

In the construction for example of a hangar for the accommodation of one aeroplane as illustrated in Figs. 1, 2 and 3, four rafter trusses may be provided each consisting of rafter members $a^1$ $a^2$, a brace or tie $a^3$ and a vertical member $b^1$ mounted in alinement with a supporting post $b$ by which the truss thus constituted is supported in a middle position, Each truss is supported at the rear by a post $g$. Between the two centrally disposed trusses the body or fuselage of the aeroplane $c$ may lie, while the plane $c^1$ may extend beneath the overhanging parts of the trusses. The roof and sides may be covered with canvas $d$ or any other suitable material secured in position in any convenient way and the front of the structure may be closed in any suitable way as for example by means of the canvas $d$ as illustrated in Fig. 3 and guys $e$ $f$ may extend in line with the trusses $a^1$, $a^2$, $a^3$, $b^1$ at the front and rear and sides and be fastened to anchoring bolts in the ground as illustrated.

The posts $b$ and $g$ for the support of the rafter trusses $a^1$, $a^2$, $a^3$, $b^1$ may be formed of rectangular cross section and from a number of boards which form the respective faces of the post. The upper ends of the posts $b$ and $g$ are adapted for the connection to the truss and the trusses are connected together by means of plates $h$ at each side with bolts passing through the plates and through the adjacent ends of the respective parts in known manner; or the respective adjacent ends of the parts of the truss or of the posts to be connected together may be provided with angle pieces at the end. Each angle piece comprises an outwardly extending end adapted when the parts or members are arranged in position to be fastened together to protrude at each side into central holes formed in coincidently disposed fastening plates or disks mounted upon each side of the adjacent parts or member to be connected and when the respective parts to be connected are brought into their proper relation to each other with the ends of the angle pieces inserted into the respective fastening plates, a fastening bolt is passed through the coincident fastening plates and the two are fastened together thus firmly holding the adjacent ends of the parts to be connected which are effectively held by the engagement of the angle pieces in the holes of the fastening plates. Such a means of connection is of special utility for the connection of the respective parts or members at the junction between the central vertical member of the truss and the respective parts of the tie and the middle post but it may be applied to other parts, that is to say for example for the connection together of the central vertical member of the truss to the ridge member. This will be found set forth below in specific detail in connection with Figs. 10 to 15.

The respective members $a^1$, $a^2$, $a^3$, $b^1$ may be connected together by means of trussed purlins $i$, $i^1$, $i^2$, $i^3$. These purlins may be mounted at the front and the rear of the trusses and at the ridge. Further the rear part of the rafter truss may be reinforced or trussed as by the members $a^4$ $a^5$.

It will be understood that by such a construction the respective parts of the structure can be readily put together and as readily dismounted, an advantage of special importance for use in the field.

In carrying the invention into effect in the construction of a hangar as illustrated in Figs. 4 to 18 of the accompanying drawings, I provide four main rafter trusses of the construction described with reference to Figs. 1 to 3, comprising main members $a^1$, $a^2$, $a^3$ and $b^1$ the rafter trusses at each end being respectively supported by three posts, one $j$ at the front, one $g$ at the back and another $b$ in alinement with the vertical member $b^1$ of the truss in a middle position. The intermediate rafter trusses are directly supported from the ground at the rear only by means of posts $g$ and the vertical members $b^1$ of the intermediate rafter trusses are utilized to form a longitudinal or ridge truss or girder by providing a tension member $k$ or wire rope to extend under the lower ends of the vertical members $b^1$ of the intermediate rafter trusses of which there are two in the illustrated construction. The tension member $k$ is at each end upwardly directed for connection to the end of the ridge member $l$ or to a terminal fitting $h$, Fig. 9, mounted upon the central post $b^1$ of the respective end rafter trusses by means of which the ends of the ridge member are connected to the end rafter trusses. The forward portions of the intermediate rafter trusses extend from the longitudinal girder as cantilevers. By such means the ridge member and roof are strengthened and the weight of the roof effectively carried without support of the intermediate rafter trusses in a middle position or at the front.

It will be noted that the arrangement indicated brings the member $b^1$ askew with respect to the other parts of a truss but vertical or practically in line with the supporting posts $b$. It will also be noted that the arrangement I have indicated in which the rear is low and the rafter trusses pitched forward and upward gives substantially even and sufficient slope or pitch to the roof members $a^1$, $a^2$.

The respective vertical members or struts $b^1$ of the intermediate rafter trusses are, however, supported against stresses longitudinally of the structure by means of angularly disposed struts $l^1$ extending on each side for connection with the ridge member $l$, while similarly the vertical member or post $b^1$ of the end rafter trusses may be connected to the ridge member $l$ by a similar strut $l^1$. Guy ropes $f\ f\ f$ may be connected to the end struts at the ridge and purlins for support of the structure against endwise stresses while guys $e$ may be connected in line with the rafter trusses.

In addition to being connected by the ridge member $l$ and tension member $k$ of the longitudinal trussed girder, the rafter trusses are connected at the rear and front by purlins $i$ and $i^1$ respectively.

The respective truss members $a^1$, $a^2$, $a^3$, $b^1$ may be connected together and the trusses may be connected to form the building by the use of junction fittings or fastening plates such as hereinbefore described which do not necessarily require that the connecting bolts shall be removed when the structure is pulled down for transport or re-erection.

In Figs. 9 and 10 are illustrated the means that may be employed to secure the respective members of the rafter trusses together and to the ridge member and for securing members of the end trusses to the vertical supporting posts $b$.

Figure 11:
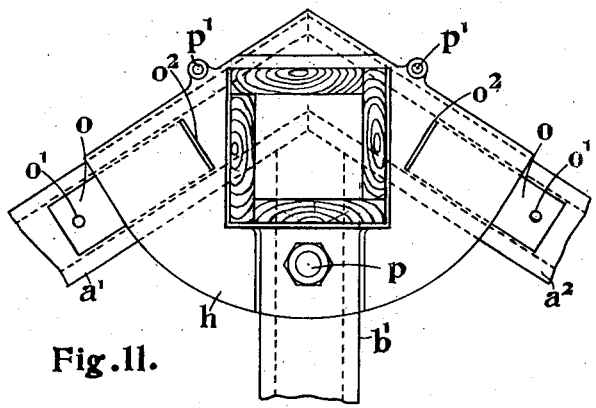
Figure 12:
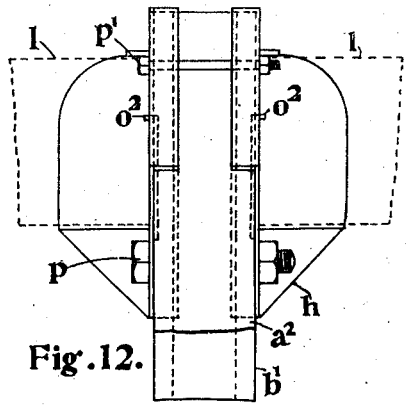
Figure 13:
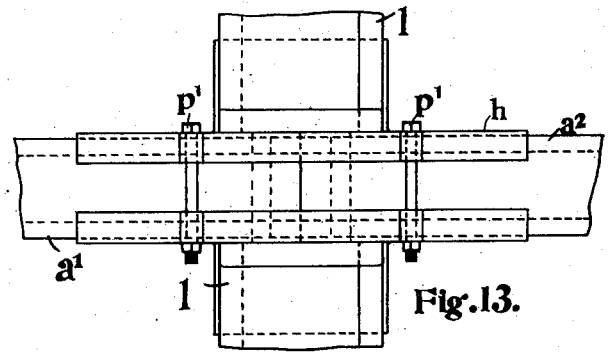
Figure 14:
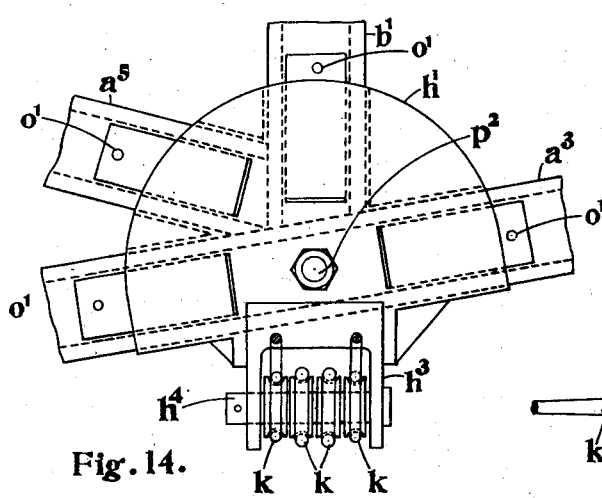
Figure 15:
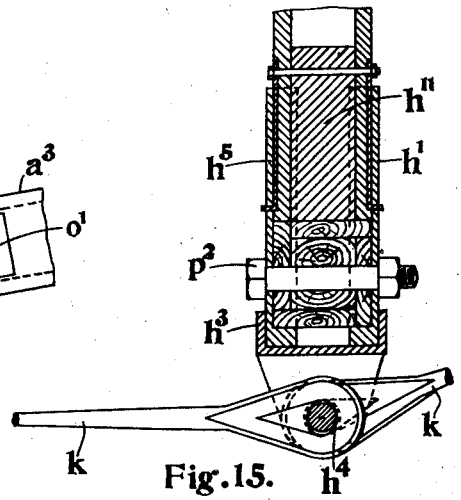

Figs. 11, 12 and 13 show detail views of the manner in which the rafter members and vertical post of the respective trusses are secured together and to the ridge member, while Figs. 14 and 15 illustrate in detail the manner in which the vertical members of intermediate rafter trusses are secured together and supported by the tension wire $k$.

As illustrated in Figs. 10 to 13 coincident plates $h$, $h^1$, $h^2$ are provided on each side of the ends of the truss members to be connected together. The ridge member as well as each of the members of the rafter trusses are comprised of square sections made up from four wooden boards secured together to form a tube of rectangular section, and at ridge the coincident fastening plates $h$ are provided secured to the post $b^1$ by bolt $p$ and formed on their outer faces with sockets for the reception of the ends of alined sections of the ridge member $l$, their inner faces being formed to provide radial recesses for the reception of the rafter members $a^1$ $a^2$ and for the vertical member or post $b^1$. The vertical member or post $b^1$ as illustrated in Figs. 11, 12 and 13 passes upwardly between the respective fastening plates $h$ and its end is thus interposed between the oppositely disposed ends of adjacent sections of the ridge member $l$.

Each of the members $a^1$ $a^2$ has secured on opposite faces in coincident positions thereon an angle piece or plate $o$ which is secured in position by means of a screw or screws or bolt or bolts such as $o^1$. The outwardly turned end $o^2$ of each fastening plate is adapted to enter a hole of corresponding shape provided in coincident positions on the respective fastening plates $h$ so that thus on the bolt $p$ and the bolts $p^1$ $p^1$ being tightened, the post $b^1$, and the truss members $a^1$ $a^2$ are firmly and securely held in position.

By such means it will be understood that the respective members of the rafter trusses are readily put into the position in which they have to be connected together and by such means the respective adjacent ends are firmly secured. Furthermore the bolt $p$ need not be completely withdrawn but only sufficiently, to release the ends of the members $a^1$ $a^2$, the bolts $p^1$ being loosened, the fastening plates $h$ being thus retained connected to the upper end of the vertical member $b^1$. The end junction fittings or fastening plates $h$ are provided as illustrated in Fig. 10 with the outer plate having no hole or socket for the reception of the end of a ridge member. The terminal fitting or fastening plates are otherwise constructed the same as illustrated in Figs. 11, 12 and 13.

The fastening plates $h$ may instead be secured by means of screws or bolts to the ends of complete sections of the ridge member as illustrated in Fig. 9 and they may be fixed in position by means of screws or bolts.

The ridge member $l$ may be made up of short lengths and may be secured together or reinforced by means of sleeves or plugs at $l^2$, screws, bolts or other means being employed to secure the respective lengths together in a more or less permanent way although this joint may if desired be made more or less temporary and capable of ready disconnection where it is desired to transport the ridge member in small sections. Similarly the members of the trusses may be provided with reinforcing blocks or sleeves.

The connection of the parts of the brace or tie $a^3$ of each end truss with the vertical member $b^1$ and the post $b$ may be effected in substantially the same way as before described for the connection of the members of the truss at the ridge, but in this case the coincident fastening plates $h^1$ may be connected together by means of a central bolt $p^2$ and the ends of the respective parts and the ends of the members $b^1$ and $a^3$ and post $b$ may each be provided with an angle piece or member $o$ on each side whose outwardly extending part $o^2$ is adapted to engage in coincident holes in the respective fastening plates $h^1$, the respective fastening plates $h^1$ being formed on their inner sides to provide recesses to receive the ends of the respective members. Similar fastening plates $h^2$ of angular shape may be provided to connect together the adjacent ends of the members $a^2$ $a^3$ and $a^1$ $a^3$.

The plates $h^1$ for the intermediate rafter trusses, shown in detail in Figs. 14 and 15, are similar to those for the end trusses except that they are adapted to receive a bracket or fitting $h^3$ secured in position by means of bolts or other means and adapted for the reception of a pin $h^4$. The pin $h^4$ of each bracket has connected to it wire ropes forming sections of the tension member $k$ of the longitudinal trussed girder, two such ropes extending in either direction from each pin $h^4$. The ropes extending in one direction are connected at their opposite ends to the pin $h^4$ of the bracket carried by the adjacent intermediate rafter truss, and the ropes extending in the other direction are connected at their other ends to the plate $h$ at the upper end of the vertical member of the adjacent end rafter truss.

Figure 5:
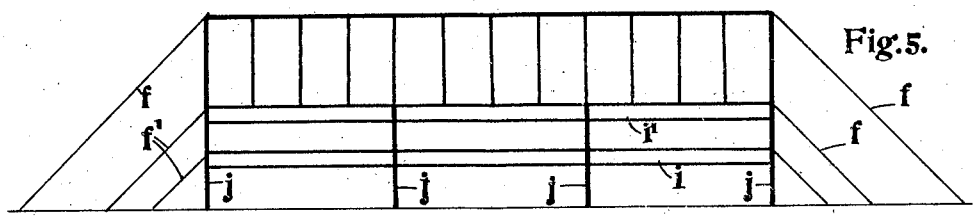
Figure 6:
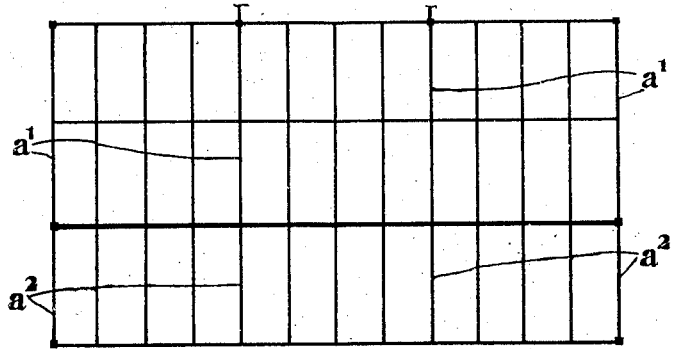
Figure 8:
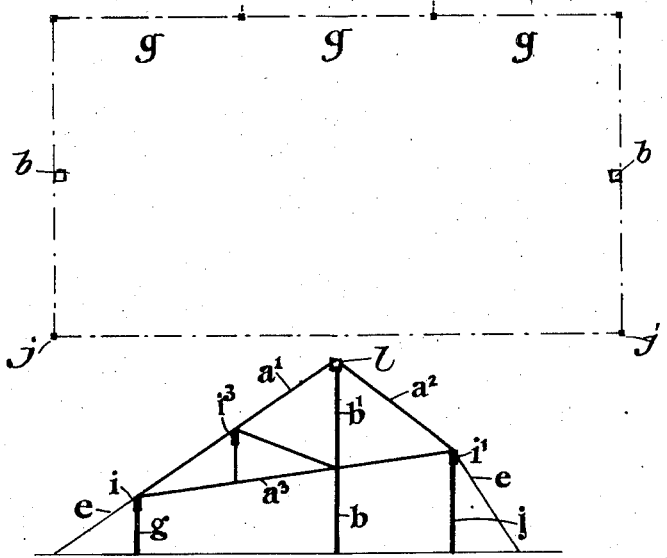
Figure 7:
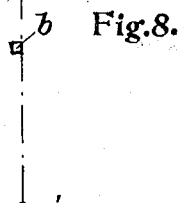

In positions between the intermediate rafter trusses and between the intermediate rafter trusses and the end rafter trusses, rafters $q$ are advantageously interposed as illustrated in Figs. 5, 6, 8$^a$ and 16. These rafters may be formed as shown in Figs. 16, 17 and 18, being trussed and formed of two longitudinal parts separated in the middle portions by means of distance pieces $q^2$ and brought together at their respective ends and connected to a block $q^3$ at each end which serves respectively for connection to the rafter member $l$ and to the purlin $i$ or $i^1$ respectively by means of fastening brackets $q^4$ $q^5$ and bolts $q^{41}$ and $q^{51}$ respectively. Struts $r$ are provided as triangular frames pivoted between the longitudinal members of the rafter $q$ at $r^1$ and adapted to be engaged by means of a latch $r^2$ in their extended positions and to rest within a recessed plate $r^3$ whose ends are connected to the rods $s$, the opposite ends of which are secured to bolts $r^4$ carried at the respective ends of the rafter. Nuts $r^{41}$ serve to apply tension to the tie rods $s$.

It will be understood that the latch $r^2$ carried by one of the struts $r$ enters within a recess provided in the end of the opposite strut $r$ or within a plate therein and that on the latch $r^2$ being withdrawn the struts $r$ may be laid in position between the horizontal members of the rafter $q$ when it is desired to dismount the rafter for transport.

The purlins $i$ $i^1$ are disposed vertically, they are connected to the end posts $g$ and $j$ respectively, and in intermediate positions, they serve to connect the ends of the intermediate rafter trusses and support the outer ends of the intermediate rafters and they are trussed in the manner illustrated in Figs. 1 8$^a$ and 21 particularly. A trussed purlin $i^3$ may be provided in the position indicated in Fig. 7 and this may be connected to the members $a^1$ of the respective rafter trusses and may serve to carry the ends of the intermediate rafters in the manner before described.

Figure 4:
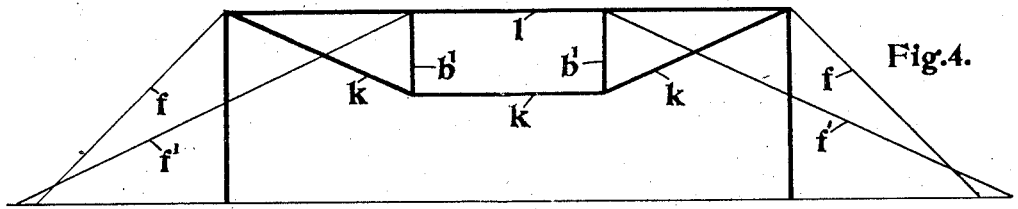

Guy ropes $f^1$ may as illustrated in Fig. 4 be provided adjacent the intermediate trusses and whose opposite ends are anchored in the ground so as thus to contribute to the longitudinal stability of the structure.

It will be understood that the rafter trusses provided according to the invention have their respective rafter members of an unequal length so that thus the front part of the structure may be unsupported from the ground at intermediate points and if desired it may be unsupported at the front completely. The roof thus constructed is completely supported at the rear and it is supported at the sides from the ground by posts disposed in alinement with the vertical members of the end trusses while at the front the end rafter trusses may also be supported from the ground by means of posts. The form of the rafter trusses is such that the tie inclines upwardly toward the front of the structure.

It will be understood that such a portable or knockdown structure as shown to illustrate the invention may be covered with canvas roofing sheets or with roofing boards, but it is preferred to use a roofing of canvas and to provide a covering for the sides, front and rear of the same material.

In carrying the invention into effect according to Figs. 19 to 22, I employ a construction in general corresponding to that illustrated in Figs. 1, 2 and 3 modified by the provision of a longitudinal rafter supporting or ridge truss or girder as in the construction illustrated in Figs. 4 to 8. Thus in this case the intermediate rafter trusses are supported from the ground only at the rear so that the front of the structure is completely open as illustrated in Fig. 21, in which figure only parts of the intermediate trusses appear. The construction is in general substantially the same as that of the modifications previously described and the same reference letters are applied on the same parts. Additional struts and pillars are, however, provided with a view to strengthen the end trusses as illustrated in Fig. 22.

The ridge member, the posts and the members of the truss may be built up of boards to form elements of hollow rectangular shape. The rafters may as illustrated in the section view Fig. 22$^a$ be provided of a rectangular section or of T-section as illustrated in Fig. 22ᵇ. The respective lengths or sections of the hollow ridge members and the members of the rafter trusses may be connected together by means of blocks fitting within the oppositely disposed ends and secured in position by means of screws or bolts passing through the respective walls of the members or otherwise. Similar blocks may be mounted at intervals in the respective elements for strengthening them.

In Fig. 22 is shown an elevation of the framing of the left end of a hangar constructed according to my invention, all the parts being indicated in their proper positions though certain of detail are necessarily left out, and certain additional struts and pillars shown.

I claim:

1. A roof comprising a series of triangular trusses and an intermediate post under each of the end trusses, a longitudinal truss uniting said triangular trusses, said longitudinal truss having the same vertical depth as the deepest part of the triangular trusses, and the upper chord of said longitudinal truss constituting the ridge pole of the structure, said longitudinal truss being supported by said intermediate end posts, and a longitudinal purlin connecting the projecting ends of the triangular trusses, the intermediate triangular trusses extending forward from the longitudinal truss as cantalivers, thereby avoiding necessity for intermediate supports.

2. In a roof for an open front hangar for aeroplanes, in combination, a series of rear posts, two end posts intermediate front and rear, a longitudinal truss extending between said intermediate posts, and a triangular truss extending from the line of the rear posts forward, said triangular truss being united with the longitudinal truss intermediate its length and being thus supported so that its forward end may be unsupported, whereby the front and interior of the hangar are left unobstructed.

3. In a roof for an open front hangar for aeroplanes, in combination, a series of rear posts, two end posts intermediate front and rear, a longitudinal truss extending between said intermediate posts, and a plurality of triangular trusses extending forward from the line of the rear posts, the deepest part of said triangular trusses coinciding with the depth of the longitudinal truss, said triangular trusses constituting rafter trusses, and the forward ends of the triangular trusses extending from the longitudinal truss as cantalivers, whereby the front side of the hangar is unobstructed by posts.

4. In a roof structure, in combination, end posts, a truss between them arranged in a vertical plane, triangular rafter trusses extending obliquely upward from rear to front, the said rafter trusses being united with the longitudinal truss at their deepest part, and parts of the longitudinal truss forming vertical struts in the obliquely extending rafter trusses, and supports for the rear of the rafter trusses, whereby the forward ends of the upwardly inclined rafter trusses may be unsupported, thereby leaving the front unobstructed.

5. In a roof structure, in combination, a longitudinal truss, end and intermediate transverse rafter trusses crossing and extending forward of the longitudinal truss, the lowest and longest member of each of which transverse trusses is inclined, vertical posts or struts of unequal length in the transverse trusses, the longest of which posts of the intermediate transverse trusses also form struts in the longitudinal truss, the longitudinal truss comprising a ridge member and a tie member extending under all the struts in the longitudinal truss and secured at its ends to the end parts of said truss, whereby the longitudinal and obliquely arranged transverse members are secured together into one structure, and posts at the rear and sides only for supporting said structure, whereby the front is left unobstructed.

6. A structure comprising parallel disposed rafter trusses extending from front to rear, each rafter truss being constituted of elements including a vertical strut intermediate its length and rafter elements on one side longer than upon the other side of the truss, said trusses having their lower members upwardly inclined toward the front of the structure, longitudinal members connecting the said trusses, said longitudinal members including a ridge member and a lower or tension member and forming with said vertical struts a longitudinal truss by which the transverse trusses are supported and from which ends of the transverse trusses extend as cantalivers.

7. In a hanger for aeroplanes, in combination, a plurality of rafter trusses arranged parallel, said trusses being arranged with the bottom of each inclined and each being provided with top members sloping from a point nearer one end than the other, each having a member extending vertically from said point and meeting the base member obliquely, means connecting said rafter trusses substantially in the plane of said vertical members and forming with said vertical members a longitudinal truss, supports for said longitudinal truss, and means for supporting said rafter trusses at one side of said longitudinal truss, said rafter trusses extending from the other side of said longitudinal truss as cantalivers.

8. In a portable and knockdown hangar for aeroplanes, in combination, a ridge member, a line of low posts to the rear, higher posts forward of these and under the ridge member, end rafter trusses and one or more intermediate rafter trusses arranged to have their rear ends supported by the rear posts and to extend obliquely forward and upward, each of said rafter trusses having a vertical member arranged to come directly under the ridge member and having a cantaliver end extending forward from said vertical member, a tie member forming with said ridge member and said vertical members of the intermediate rafter trusses a supporting truss, purlins for uniting said rafter members, and interfittings whereby the whole may be knocked down for easy transportation.

9. In a structure comprising parallel rafter trusses, in combination, a longitudinal truss formed by a ridge member, posts of the intermediate transverse rafter trusses and a tension member or tie passing beneath the said posts parallel with the ridge member and connected at or near the respective ends of the ridge member adjacent the end transverse rafter trusses, and only rear and end posts for supporting the structure, end posts being under the ends of and in the plane of the longitudinal truss, and the rear posts being under the ends of the transverse rafter trusses, whereby the front and interior of the structure are left unobstructed by posts, substantially as described.

10. A roof structure comprising a series of transverse trusses having strut members, a support for each of the end trusses of the series, a longitudinal truss uniting said transverse trusses intermediate the ends thereof, strut members of the intermediate transverse trusses being also strut members of said longitudinal truss, said longitudinal truss being supported by the end transverse trusses and supporting the intermediate transverse trusses, and means for supporting the intermediate transverse trusses at one side of the longitudinal truss, said transverse trusses extending from the other side of said longitudinal truss as cantalivers, whereby the structure is supported with one side unobstructed to provide space for free ingress.

11. A roof structure comprising a trussed girder having a plurality of vertical strut members, end supports therefor, a plurality of transverse trusses extending across and supported by said trussed girder and united therewith with said vertical strut members of the trussed girder serving as vertical strut members of said transverse trusses, and means for supporting said transverse trusses at one side of the trussed girder, the transverse trusses extending from the other side of the trussed girder as cantalivers.

12. A roof structure comprising a trussed girder having a plurality of vertical strut members, end supports therefor, a plurality of transverse trusses extending across and supported by said trussed girder and united therewith with said vertical strut members of the trussed girder serving as vertical strut members of said transverse trusses, means for supporting said transverse trusses at one side of the trussed girder, the transverse trusses extending from the other side of the trussed girder as cantalivers, purlins connecting said transverse trusses, and rafters between said transverse trusses carried by said purlins and the upper member of said trussed girder.

13. In a portable and knockdown hangar for aeroplanes, in combination, a series of triangular rafter trusses supported at their rear ends and extending forward and obliquely upward, a ridge member uniting said trusses, purlins uniting said trusses at their front and rear ends, said trusses having a vertical member arranged to come directly under the ridge member, means for supporting said trusses beneath said vertical members, said trusses extending forward from said vertical members as cantalivers, and interfittings whereby the whole may be knocked down for easy transportation.

THOMAS EDGAR RICHARDS.